E. R. GODWARD.
METHOD OF AND APPARATUS FOR CARBURATION.
APPLICATION FILED APR. 13, 1916.

1,283,154.

Patented Oct. 29, 1918.

Witnesses

Inventor
Ernest R. Godward
by
Attorney

UNITED STATES PATENT OFFICE.

ERNEST ROBERT GODWARD, OF DUNEDIN, NEW ZEALAND.

METHOD OF AND APPARATUS FOR CARBURATION.

1,283,154. Specification of Letters Patent. Patented Oct. 29, 1918.

Application filed April 13, 1916. Serial No. 90,921.

*To all whom it may concern:*

Be it known that I, ERNEST ROBERT GODWARD, a subject of King George V of Great Britain, residing at 40 Dowling street, Dunedin, New Zealand, have invented certain new and useful Improvements in Methods of and Apparatus for Carburation, of which the following is a specification.

This invention relates to carburation, and its objects are to provide a novel and improved method of carburation and also an extremely simple apparatus or device capable of carrying out the method whereby a highly efficient and uniform fuel mixture is obtained wherein all of the hydrocarbon particles, both light and heavy, are absorbed and utilized.

This invention relates to mixers for gaseous fuel.

In ordinary carbureters, the explosive mixture, on being supplied to the combustion chamber of the engine, contains particles of raw or wet fuel, instead of being in the form of a gaseous mass or body in which all of the particles of fuel are completely vaporized; and as a result, a certain proportion of these raw or wet particles are entirely wasted, and even in many instances tend to wash the lubricating oil off the walls of the cylinders. This objectionable feature is caused, to some extent at least, by the introduction of the wet mixture into the combustion chamber in quantities in excess of that actually required for proper carburation; but it is mainly due to the fact that a perfect mixture of hydro-carbon vapor and air can only be produced with sufficient rapidity by vaporizing the hydro-carbon and air in an expanded atmosphere. It follows, therefore, that such a mixture cannot be produced by subjecting free, wet petrol particles, suspended in air, to compression in the engine; but, on the other hand, it is apparent that if the mixture were introduced into the engine from the carbureter in a dry state, the defects mentioned would be completely obviated.

The present invention aims to produce just such a dry, gaseous mixture as that specified; that is to say, a gaseous mixture in which all of the hydro-carbon particles, both light and heavy, are completely vaporized, so that it is to all intents, and for all practical purposes, perfectly dry, and which will constantly remain in its gaseous state, and will not have a tendency toward condensation, whether under ordinary atmospheric conditions, or under those existing in internal combustion engines. The production of this dry, gaseous mixture is effected by stretching and expansion of the hydrocarbon particles preferably in a specially-constructed space or chamber which increases in capacity from its inlet end to its outlet end, with the result that while the lighter hydrocarbon particles are readily taken up and absorbed by the incoming air, the heavier particles are held in mechanical suspension and subjected to a gradual and thorough expansion and stretching action, which ultimately thins them out until they likewise are absorbed. Hence, when the mixture finally reaches the engine, instead of wet particles of hydrocarbon in suspension being contained therein, all of the particles will be completely vaporized, and in consequence, substantially the absolute maximum mileage or cruising or traveling radius per gallon can be obtained from the fuel, while the cost of running is proportionately decreased.

Referring to the accompanying drawings—

Figure 1:
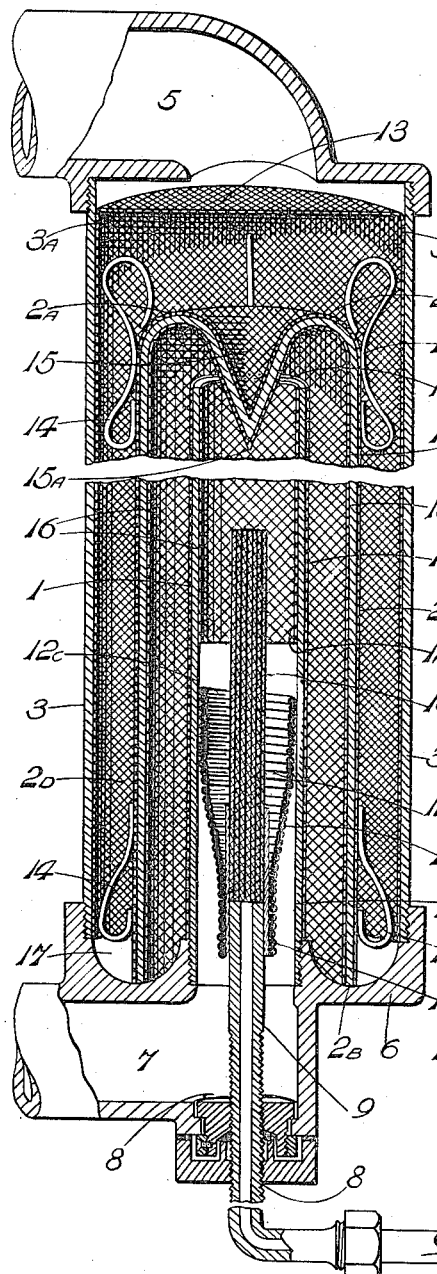
Figure 1 is a vertical sectional view of one embodiment of an apparatus, capable of carrying out the invention, showing the positions assumed by the moving parts when the engine is stationary.
Figure 2:
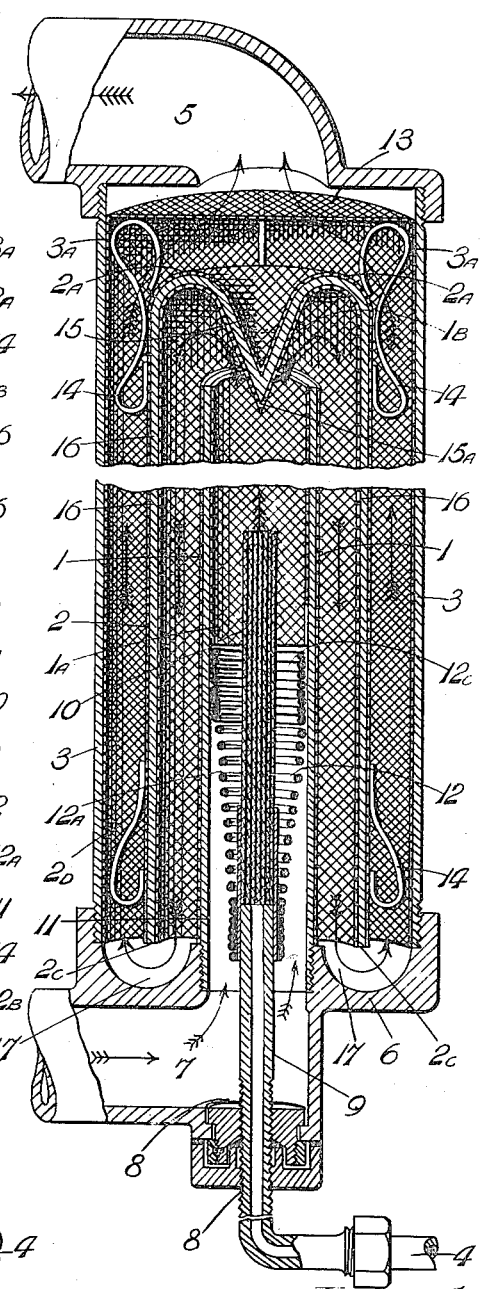
Fig. 2 is a similar view, but showing the positions of said parts when the engine is running, and the system receiving air and petrol.

The apparatus shown in the present instance as one adapted to carry out the invention primarily comprises three tubes 1, 2 and 3, of different diameters, disposed co-axially one within another in vertical position at any convenient point to form a junction between the petrol feed 4 and the induction pipe 5. The inner tube 1 and the outer tube 3 are mounted upon a base member 6, having an inlet 7 for air, and an opening 8 in which is fitted an adjustable nozzle 9. The latter projects vertically into the tube 1, which communicates directly with the air inlet at its lower end, and is connected with the feed pipe 4, which leads thereto from the usual float chamber (not shown); the arrangement being such, therefore, that petrol will be maintained within the nozzle at a substantially constant level.

In the upper end 11 of said nozzle, there is secured a carrier for the petrol which serves to expose the latter to the action of the in-coming air, said carrier being shown as a tightly wound roll 10 of foraminous material, preferably wire gauze, which remains uncharged with the petrol under ordinary atmospheric pressure, but becomes charged therewith when in a partial vacuum. This roll extends upwardly within the inner tube 1, as shown, and its lower end is disposed either in actual contact with the petrol in the nozzle, or close to the level thereof, so that in either instance, the roll will be fully charged with the petrol when the suction stroke of the engine takes place, the strands of the gauze forming an actual mechanical support for the particles of petrol at such time. Consequently, the incoming air, as it enters the tube 1, will lick off, as it were, a certain proportion of the petrol contained in the meshes of the gauze, the particles thus taken up by the air being very much more minute than would be the case with a jet nozzle.

Means is provided to control the entrance of the air into said tube, and in the construction illustrated, there is shown for that purpose a valve 12, which is located at, or close to, the bottom of the tube, and is so constructed as to practically shut out the air when the engine is stationary, and to open automatically to an extent proportional to the speed of the engine when the latter is running. In the embodiment illustrated, which may be regarded, for all present purposes, as preferred, this valve is in the form of a frusto-conical metal coil, the convolutions $12^A$ of which are normally in contact with one another, but are pulled apart to admit the air by the suction stroke of the engine. The small end $12^B$ of the valve fits over and is fixed to the end 11 of the nozzle 9, while its large end $12^C$ is disposed in sliding contact with the inner surface $1^A$ of the tube 1, and has the same diameter as said surface.

The inner and outer tubes 1 and 3 are fixed to the base 6; and the former is open and free at its upper end $1^B$, and is approximately one and one-half inches shorter than the latter tube, whose upper end $3^A$ is connected with the induction pipe 5 and is provided, adjacent such point, with a series of gauze disks 13 to prevent back-firing. The intermediate tube 2, however, instead of being stationary or fixed, has a floating mounting or arrangement, and is spaced and guided during its travel by means of suitable wire lugs 14, or the like, attached to the upper and lower ends $2^A$ and $2^B$ of said tube, the upper lugs also functioning as stops to limit the upward movement of the tube. The upper end of the said tube is closed by a cap 15, which is, or may be, integral with the tube, and is so constructed as to provide a central baffle or deflector that acts to throw the wet charge radially outward in all directions against the wall of the floating tube, this baffle being here shown as in the form of an inverted cone, whose apex $15^A$ depends axially into the open upper end of the inner or elevator tube 1. In addition to deflecting the charge in the manner just stated, the floating tube 2 serves to control the speed of the gaseous mixture in the annular space or chamber $2^D$ between the walls of the outer and intermediate tubes, the said intermediate tube rising to a greater or lesser extent as the engine develops a greater or lesser power according to its load or speed, thereby increasing or reducing the space 17 at the bottom of the apparatus and, consequently, admitting or choking the mixture to or from the aforesaid space or chamber $2^D$. The tubes 1 and 2, as shown, are provided with roughened internal and external supporting surfaces on which the heavier hydrocarbon particles are deposited and held as hereinafter explained, the roughening being effected in the present instance by lining these tubes both internally and externally with fine gauze or other foraminous material 16, and the tube 3 is shown as similarly roughened or lined internally only.

In operation, the process of carburation commences within the inner tube 1, the induction stroke of the engine creating a partial vacuum in the apparatus, which raises the floating tube 2, and causes the gauze carrier roll 10 to become charged with petrol, and the valve or cone 12 to expand and open. The in-coming air passes through the spaces between the convolutions of the cone, and plays against the charged roll, licking off a portion of the petrol, as previously stated. The lighter particles of petrol are immediately absorbed by the air and carried upwardly therewith, and the heavier particles of petrol are also carried in suspension in the air until the air in its upward progress begins to expand and its velocity is consequently diminished, whereupon the momentum of such heavier particles of petrol is overcome by the influence of gravity, so that these particles become deposited in film form upon the supporting wall or gauze lining of the tube. The heavier particles of petrol so deposited upon the supporting wall or gauze, fill the meshes thereof, and are mechanically supported thereby, and, as the air-current continues its upward course, such particles of petrol are subjected by the air current to a stretching and expanding action which gradually spreads them out in a thin film upon the supporting wall or gauze. This stretching and expanding action is due to the presence of the partial vacuum within the tube and also to the frictional contact of the air with the suspended particles of petrol as the said current of air moves onward through the tube. As thus stretched and expanded, the liquid particles of petrol are thinned out so as to be easily vaporized and absorbed by the passing air current. It is to be understood that the air current is not entirely freed from the heavier particles of liquid petrol while passing through said elevator tube since the process of removal from suspension and deposit on the supporting walls or foraminous surfaces above described is but begun in said tube. On reaching the top of this lifting or elevator tube, the wet mixture, that is, the air current containing such vaporized hydrocarbon as it has absorbed while still containing a proportion of liquid hydrocarbon particles in suspension, comes in contact with the depending baffle 15, which splits the current centrally and deflects it into the annular space between the elevator tube and the floating tube 2, and against the supporting wall or gauze lining of the latter tube, with the result that a further portion of liquid particles of petrol in suspension is also deposited upon said supporting wall or lining. The mixture then descends through this intermediate annular space, impelled by the drag of the vacuum, both depositing a portion of its liquid hydrocarbon particles and at the same time subjecting such deposits thus mechanically supported to the stretching and expanding actions in the manner above described, so that the same may be more easily vaporized and absorbed by the passing air. The said space or chamber has, however, a considerably greater capacity than the elevator tube 1, and for that reason the mixture, on entering the chamber, slows up appreciably, and expands in order to meet the increased capacity, as will be understood, the stretching and expanding action exerted upon the deposited wet particles being increased proportionately. On reaching the bottom of the chamber, the mixture passes beneath the lower edge $2^c$ of the floating tube, and enters the outer annular space or chamber $2^D$, through which it ascends, under the drag or pull of the suction, and from which it finally escapes at the top $3^A$, through the gauze disks 13, into the induction pipe 5. During such ascent, any heavier particles of petrol which may still remain in the mixture, are deposited on the supporting wall or gauze lining of the outer annular chamber $2^D$, there to be stretched and expanded until absorbed, in the same way as before; and since this final chamber $2^D$ has an even greater capacity than the intermediate chamber, the expansion and stretching action which takes place herein, will be proportionately more vigorous than in said intermediate chamber, and the speed of the mixture will be proportionately slower. The mixture thus leaves the apparatus in a state of substantially uniform density, with all of the hydro-carbon particles completely vaporized, and with substantially all of the moisture removed.

During operation, the floating tube 2 continues in motion, according as the speed of the engine fluctuates, said tube rising as the speed and, consequently, the suction created, increase, and falling as they decrease, so that the position of the tube is at all times dependent upon the operation of the engine. When the engine stops, the floating tube drops to its position upon the base member 6, thus shutting off further supply of mixture or charge to the outer chamber; but the portion of the gaseous charge still contained in the outer and intermediate chambers, fills the same up to the level of the top of the elevator tube 1, and remains therein, since the only outlet open at such time is in the elevator tube, into which, however, the charge cannot pass, being heavier than the atmosphere. Hence, this trapped body of gaseous mixture constitutes a reserve supply, which may be utilized when next the engine is started; and inasmuch as some of the wet petrol deposited on the supporting walls or foraminous surfaces of the tubes will still be clinging thereto, this reserve body will be enriched thereby, and, also, by any petrol in liquid form which may have condensed upon said base, so that a sufficiently-enriched supply of mixture is always available for starting purposes.

I claim as my invention—

1. The herein described method of carburetion, which consists in passing an initially-constricted current of air through a chamber of progressively-increasing area containing a supply of hydrocarbon adjacent its inlet, so as to cause the velocity of the air current to change in accordance with the changes in area in said chamber, and also to cause the air to absorb the lighter hydrocarbon particles and deposit the heavier hydrocarbon particles on the walls of the chamber; and subjecting the said heavier hydrocarbon particles to a constant stretching and expanding action in a partial vacuum by and in the presence of the air current while mechanically supported on said walls until said heavier hydrocarbon particles are thinned out by such stretching and expanding action to the point where they are likewise absorbed, thereby producing a substantially dry gaseous mixture in which all of the hydrocarbon particles, both heavy and light, are completely vaporized.

2. The herein described method of carburetion, which consists in passing a rough mixture of air and hydrocarbon through a chamber of progressively-increasing area, so as to cause the mixture to slow down and expand in accordance with the changes in area in said chamber, and also to cause the air to deposit the heavier hydrocarbon particles on the walls of the chamber, leaving the lighter hydrocarbons to be absorbed by the air; and subjecting the heavier hydrocarbon particles to a constant stretching and expanding action in a partial vacuum by and in the presence of the expanding current while mechanically supported on said walls, the volume of the air current being controlled in accordance with the vacuum until said heavier hydrocarbon particles are thinned out by such stretching and expanding action to the point where they are likewise absorbed, thereby producing a substantially dry gaseous mixture in which all of the hydrocarbon particles, both heavy and light, are completely vaporized.

3. The herein described method of carburetion, which consists in pulling an initially-constricted current of roughly-mixed air and hydrocarbon through a chamber of progressively-increasing area; slowing up said current by expansion thereof to deposit the heavier hydrocarbon particles on the walls of said chamber; and subjecting said heavier hydrocarbon particles while so supported to a constant stretching and expanding action by and in the presence of the expanding current until the same are absorbed, thereby to produce a substantially dry gaseous mixture.

4. A carbureting apparatus of the character specified, comprising a chamber through which the charge travels, having air and hydro-carbon supply means at its inlet end and means for controlling the flow of the air into said chamber; and foraminous material lining said chamber and arranged to mechanically suspend the heavier hydro-carbon particles deposited thereon during the progress of the charge; said chamber communicating at its outlet end with the engine, so that upon the induction stroke of the latter a partial vacuum will be created in the chamber, the drag of which will pull the charge therethrough, whereby the lighter hydro-carbon particles will be absorbed by the air, while the mechanically-suspended heavier particles will be subjected to continuous stretching and expansion and thinned until likewise absorbed.

5. A carbureting apparatus of the character specificed, comprising a chamber through which the charge travels, said chamber increasing in capacity from its inlet to its outlet end and having at its inlet end an air-supply means, a control valve for the air supply, and a carrier adapted to be charged with liquid hydro-carbon and to expose the same to the incoming air; and foraminous material lining said chamber and arranged to mechanically suspend the heavier hydrocarbon particles deposited thereon during the progress of the charge; said chamber communicating at its outlet end with the engine, so that upon the induction stroke of the latter a partial vacuum will be created in the chamber, which will cause the carrier to be charged and the air to enter said chamber and play against said carrier, thereby licking off a portion of the hydro-carbon and absorbing the lighter particles thereof, the mechanically-suspended heavier particles being subjected by the vacuum to continuous stretching and expansion and thinned until likewise absorbed.

6. A carbureting apparatus of the character specified, comprising a chamber through which the charge travels, said chamber increasing in capacity from its inlet to its outlet end and having at its inlet end an air supply means, a control valve for the air supply, and a longitudinally-disposed carrier tube in communication with a source of hydro-carbon supply so as to be chargeable with hydro-carbon and to expose the same to the in-coming air and having its outlet end communicating with the engine, so that upon the induction stroke of the latter a partial vacuum will be created in said chamber which will pull the charge therethrough, causing the carrier tube to become charged with hydro-carbon and causing the air to enter said chamber and play against said tube and to lick off a portion of the hydro-carbon and absorb the lighter particles thereof; and foraminous material lining said chamber throughout and adapted to mechanically suspend the heavier hydrocarbon particles deposited thereon during the progress of the charge, said heavier particles being subjected to continuous stretching and expansion, while so suspended, until thinned out and entirely absorbed by the air.

7. A carbureting apparatus of the character specified, comprising a plurality of communicating tubular elements disposed co-axially one within another and coöperating to form a continuous chamber which increases in capacity from its inlet to its outlet end and through which the charge travels; the innermost tube having air and hydro-carbon supply means and a control valve for the air supply at its inlet end, and the outermost tube having its outlet end communicating with the engine, so that upon the induction stroke of the latter a partial vacuum will be created within the entire chamber, which will pull the charge therethrough, the air, on entering said innermost tube, absorbing the lighter hydro-carbon particles; and foraminous material lining said tubes and adapted to mechanically suspend the heavier hydro-carbon particles deposited thereon during the progress of the charge, said heavier particles being subjected to continuous stretching and expansion, while so suspended, until thinned out and entirely absorbed by the air.

8. A carbureting apparatus of the character specified, comprising a plurality of communicating tubular elements disposed co-axially one within another and coöperating to form a continuous chamber which increases in capacity from its inlet to its outlet end and through which the charge travels; the innermost tube having at its inlet end an air inlet, a valve normally closing said inlet, and a hydro-carbon supply means, and the outermost tube communicating at its outlet end with the engine, so that upon the induction stroke of the latter a partial vacuum will be created within the entire chamber which will open said valve to admit air to said innermost tube and will pull the charge through said chamber, the in-coming air absorbing the lighter particles of the hydro-carbon supplied to that tube; and foraminous material lining said tubes and adapted to mechanically suspend the heavier hydro-carbon particles deposited thereon during the progress of the charge, said heavier particles being subjected to continuous stretching and expansion, while so suspended, until thinned out and entirely absorbed by the air.

9. A carbureting apparatus of the character specified, comprising a plurality of communicating tubular elements disposed co-axially one within another and coöperating to form a continuous chamber which increases in capacity from its inlet to its outlet end and through which the charge travels; the innermost tube having at its inlet end an air supply means and a control valve for the air supply, and being provided with a longitudinally-disposed carrier tube located interiorly thereof and in communication with a source of hydro-carbon supply, so as to be chargeable with hydro-carbon and to expose the same to the in-coming air, and the outermost tube having its outlet end communicating with the engine, so that upon the induction stroke of the latter a partial vacuum will be created within the entire chamber which will pull the charge therethrough, causing the carrier tube to become charged with hydro-carbon and causing the air to enter said innermost tube and to lick off a portion of the hydro-carbon from said carrier tube and absorb the lighter particles thereof; and foraminous material lining said tubes and adapted to mechanically suspend the heavier hydro-carbon particles deposited thereon during the progress of the charge, said heavier particles being subjected to continuous stretching and expansion, while so suspended, until thinned out and entirely absorbed by the air.

10. A carbureting apparatus of the character specified, comprising a plurality of communicating tubular elements disposed co-axially one within another and coöperating to form a continuous chamber which increases in capacity from its inlet to its outlet end and through which the charge travels; the innermost tube having at its inlet end an air inlet, a valve normally closing said inlet, and a longitudinally-disposed carrier tube, said carrier tube located interiorly of said innermost tube and in communication with a source of hydro-carbon supply so as to be chargeable with hydro-carbon and to expose the same to the in-coming air, and the outermost tube having its outlet end communicating with the engine, so that upon the induction stroke of the latter a partial vacuum will be created within the entire chamber which will open said valve to admit air to said innermost tube and cause the carrier tube to become charged with the hydro-carbon, and will pull the charge through said chamber, the in-coming air licking off a portion of the hydro-carbon from said carrier tube and absorbing the lighter particles thereof; and foraminous material lining said tubes and adapted to mechanically suspend the heavier hydro-carbon particles deposited thereon during the progress of the charge, said heavier particles being subjected to continuous stretching and expansion, while so suspended, until thinned out and entirely absorbed by the air.

11. A carbureting apparatus of the character specified, comprising open-ended, fixed inner and outer tubes, and a floating intermediate tube having a closed upper end and an open lower end, said tubes disposed co-axially one within another and coöperating to form a continuous chamber which increases in capacity from its inlet to its outlet end and through which the charge travels and is gradually expanded; the inner tube having air and hydro-carbon supply means at its inlet end and a control valve for the air supply, and the outer tube having its outlet end communicating with the engine, so that upon the induction stroke of the latter a partial vacuum will be created within the entire chamber which will lift the intermediate tube and pull the charge through the successive tubes, said intermediate tube being provided at its closed end with means for deflecting the charge, as it leaves the inner tube, against the wall of said intermediate tube.

12. A carbureting apparatus of the character specified, comprising open-ended, fixed inner and outer tubes, and a floating intermediate tube having a closed upper end and an open lower end, said tubes disposed co-axially one within another and coöperating to form a continuous chamber which increases in capacity from its inlet to its outlet end and through which the charge travels and is gradually expanded; the inner tube having air and hydro-carbon supply means at its inlet end and a valve control for the air supply, and the outer tube having its outlet end communicating with the engine, so that upon the induction stroke of the latter a partial vacuum will be created within the entire chamber which will lift the intermediate tube and pull the charge through the successive tubes, said intermediate tube being provided at its closed end with a conical member which depends into the open end of the inner tube, so as to deflect the charge, as it leaves the inner tube, against the wall of said intermediate tube.

In testimony whereof I have hereunto set my hand in presence of two subscribing witnesses.

ERNEST ROBERT GODWARD.

Witnesses:
 ROBERT WALES,
 ROBERT PARK, Jr.